US 8,644,479 B2

(12) United States Patent
Goguen et al.

(10) Patent No.: US 8,644,479 B2
(45) Date of Patent: Feb. 4, 2014

(54) METHOD AND APPARATUS FOR PROTECTING MODERATOR ACCESS FOR A CONFERENCE CALL

(75) Inventors: Joseph Patrick Thomas Goguen, Los Gatos, CA (US); Manish Sunder Punjabi, Los Altos, CA (US); Carsten Michael Bergmann, San Jose, CA (US); Harmeet Singh, San Jose, CA (US); Christina Evelyn Lucey, San Francisco, CA (US); Eric Reyes, Menlo Park, CA (US)

(73) Assignee: BlackBerry Limited, Waterloo, Ontario (CA)

( * ) Notice: Subject to any disclaimer, the term of this patent is extended or adjusted under 35 U.S.C. 154(b) by 0 days.

(21) Appl. No.: 13/423,149

(22) Filed: Mar. 16, 2012

(65) Prior Publication Data
US 2012/0269335 A1 Oct. 25, 2012

Related U.S. Application Data

(60) Provisional application No. 61/454,315, filed on Mar. 18, 2011.

(51) Int. Cl.
*H04M 3/42* (2006.01)
*H04M 11/00* (2006.01)
*H04M 1/00* (2006.01)
*H04L 12/16* (2006.01)
*H04N 7/14* (2006.01)

(52) U.S. Cl.
USPC ............ 379/202.01; 379/93.21; 379/158; 370/260; 348/14.08; 455/416

(58) Field of Classification Search
USPC ............ 370/260, 261, 259, 262; 379/202.01, 379/90.01, 93.01, 93.21, 157, 158, 201.01, 379/207.01; 455/416, 414.1
See application file for complete search history.

(56) References Cited

U.S. PATENT DOCUMENTS

| 4,635,251 A | 1/1987 | Stanley et al. |
| 2005/0018827 A1 | 1/2005 | Himmel et al. |

(Continued)

FOREIGN PATENT DOCUMENTS

| JP | 2009194661 A | 8/2009 |
| WO | 2009070103 A1 | 6/2009 |

OTHER PUBLICATIONS

Saleem A, et al., Media Server Markup Language, Internet Draft, draft-saleem-msml-07, Aug. 7, 2008, IETF document, available at: http://tools.ietf.org/html/draft-saleem-msml-07.

(Continued)

*Primary Examiner* — Khai N Nguyen
(74) *Attorney, Agent, or Firm* — Finnegan, Henderson, Farabow, Garrett & Dunner LLP

(57) ABSTRACT

A method for protecting moderator access using a communication device. The method includes: displaying an interface for editing a conference call profile, the conference call profile including conference call scheduling information including one or more addressees for communicating with a conference call server, wherein the conference call scheduling information further includes a moderator access code and a participant access code; generating an indicator for the conference call profile for excluding sending of the moderator access code to invited participants; and storing the conference call profile including the indicator in a memory of the communication device. A communication device can be configured to perform the method.

27 Claims, 13 Drawing Sheets

(56) References Cited

U.S. PATENT DOCUMENTS

| | | |
|---|---|---|
| 2006/0285670 A1 | 12/2006 | Chin et al. |
| 2008/0069328 A1 | 3/2008 | Bostick et al. |
| 2008/0069329 A1* | 3/2008 | Jonasson ................. 379/207.11 |
| 2008/0253546 A1 | 10/2008 | Chen et al. |
| 2009/0016513 A1 | 1/2009 | Miller et al. |
| 2009/0319913 A1 | 12/2009 | Serr et al. |
| 2010/0189241 A1 | 7/2010 | Miller et al. |
| 2011/0135080 A1 | 6/2011 | Lingafelt et al. |

OTHER PUBLICATIONS

Rosenberg J, et al., RFC 3261—Session Initiation Protocol, Jun. 2002, The Internet Society, available at: http://www.ietf.org/rfc/rfc3261.txt.

Extended European Search Report for European Patent Application No. 12159968.2 dated Sep. 20, 2012.

* cited by examiner

700

Edit Conference Information    123
Conference Profiles
[Current Details] ▼

Conference Information
Conference Number

US Toll Free ▼  1 866 555-5555 ✓

Internal ▼  801 71920

Other ▼  +44-0123456789

US Toll Free ▼

Participant Access Code:
0987654 — 702

METHOD AND APPARATUS FOR PROTECTING MODERATOR ACCESS FOR A CONFERENCE CALL

RELATED APPLICATION

This application claims priority from U.S. Provisional Patent Application 61/454,315 titled, "Method for Protecting Moderator Access for a Conference Call," filed Mar. 18, 2011, and is hereby incorporated by reference in its entirety.

TECHNICAL FIELD

Example embodiments relate to conference call systems and methods, for example for protecting moderator access for a conference call.

BACKGROUND

During a conference call, voice or media connections are typically made between two or more communication devices such as telephones or mobile phones.

When scheduling a conventional conference call, a user typically is required to configure the conference call manually. For example, all conference call information can be entered into specific fields or tags, including the time, attendees, host, and conference access number. When a quick meeting needs to be convened, there is time overhead required to set up the meeting. In addition, the user can be distracted from the substantive content of the meeting in order to facilitate the administrative aspect in coordinating the meeting.

One difficulty with existing conferencing systems is that unauthorized participants can attempt to join a conference call. The participants of a conference call are sometimes loosely defined wherein original invitees can forward invitations and access codes to others who can then participate. With only rudimentary security procedures such as a conference call dial-in number and access code almost anyone from any location can access a conference call, which could compromise security.

Other difficulties with existing teleconferencing systems will be apparent to those skilled in the art in view of the detailed description below.

BRIEF DESCRIPTION OF THE DRAWINGS

Reference will now be made, by way of example, to the accompanying drawings which show example embodiments, and in which:

FIG. 14 shows an example user interface for configuring conference call scheduling information from the received invitation message, in accordance with an example embodiment.

Similar reference numerals can be used in different figures to denote similar components.

DESCRIPTION OF EXAMPLE EMBODIMENTS

Figure 1:
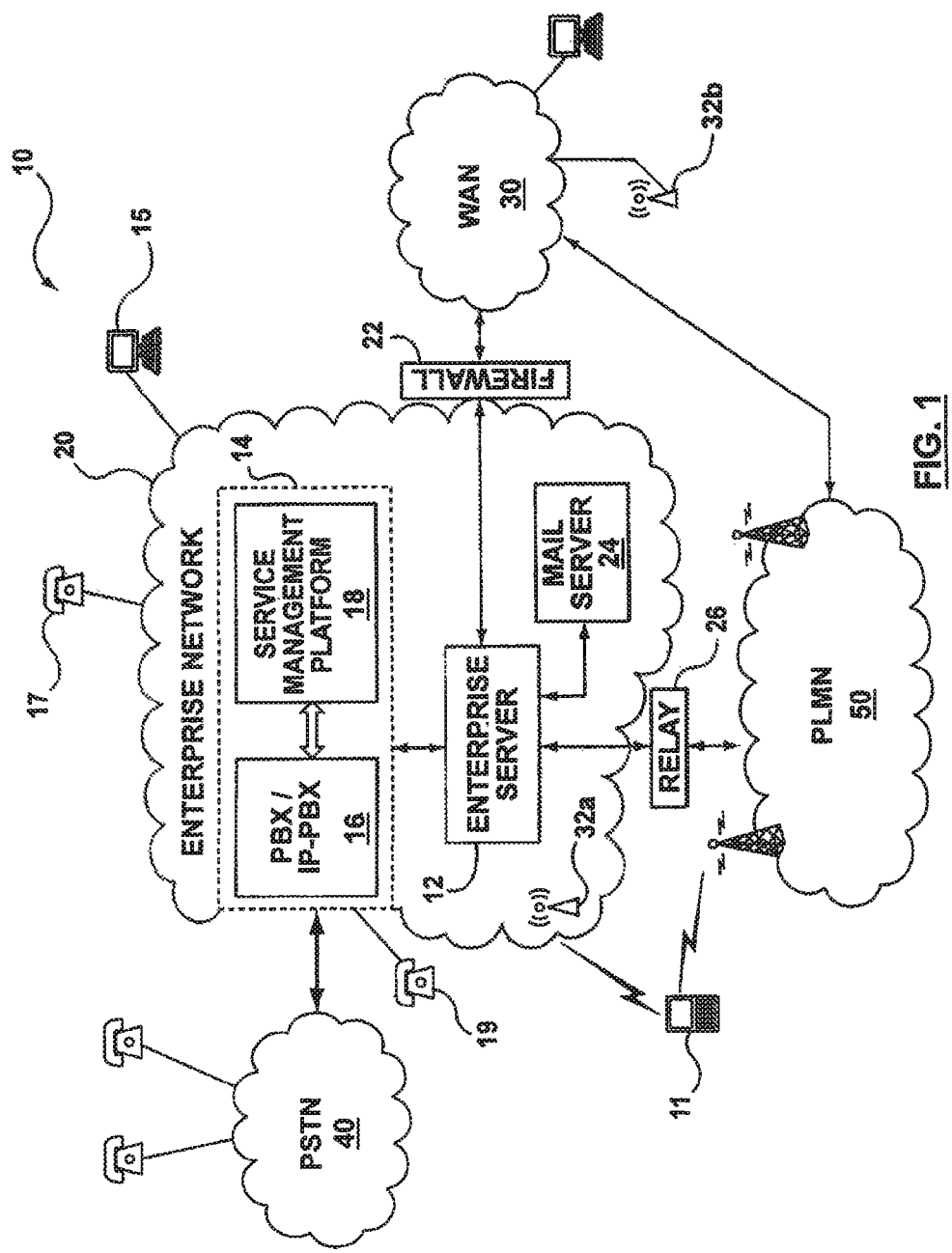
FIG. 1 shows, in block diagram form, an example system for managing enterprise-related mobile calls, including an enterprise communications platform, to which example embodiments can be applied.

Some example embodiments generally relate to protecting moderator access for a conference call.

Some example embodiments generally relate to creating and editing conference profiles. The profiles feature can provide meeting organizers the option to save conference information into profiles. When creating meetings using the conference call application, the host organizers can readily populate the conference information for the meeting by selecting a profile for that meeting. The necessary details will be automatically inserted into the meeting invitation.

In some example embodiments, the profiles can include an indicator for excluding sending of moderation information, such as a moderator access code, to invited participants.

In one example embodiment, there is provided a method for protecting moderator access using a communication device. The method includes: displaying an interface for editing a conference call profile, the conference call profile including conference call scheduling information including one or more addressees for communicating with a conference call server, wherein the conference call scheduling information further includes a moderator access code and a participant access code; generating an indicator for the conference call profile for excluding sending of the moderator access code to invited participants; and storing the conference call profile including the indicator in a memory of the communication device.

In another example embodiment, there is provided a non-transitory computer readable medium having recorded thereon statements and instructions for execution by one or more devices for protecting moderator access for a conference call, the statements and instructions comprising code means for performing the method.

In yet another example embodiment, there is provided a communication device including: a controller; a communications subsystem; a memory; and a display for displaying an interface for editing a conference call profile, the conference call profile including conference call scheduling information including one or more addressees for communicating with a conference call server, wherein the conference call scheduling information further includes a moderator access code and a participant access code. The controller is configured for: generating an indicator for the conference call profile for excluding sending of the moderator access code to invited participants, and storing the conference call profile including the indicator in the memory.

In yet another example embodiment, there is provided a method for creating a conference call profile from a communication device, wherein the communication includes a memory for storing an event record. The method includes: identifying from the event record one or more addressees for communicating with a conference call server; generating a conference call profile having one or more address fields and populating the address fields with the addresses; and storing the conference call profile in the memory.

Example embodiments relate to the control and management of conference call communications. Although reference is made to "calls" and "talk" in the description of example embodiments below, it will be appreciated that some of the described systems and methods can be applicable to session-based communications in general and not limited to voice calls. Reference to calls can, for example, include shared data (e.g. presentation content) as well as media sessions which can, for example, include video and/or audio. The various communications can include both synchronous and asynchronous communications to implement such "calls".

Reference is now made to FIG. 1, which shows, in block diagram form, an example system, generally designated 10, for the control and management of communications. The system 10 includes an enterprise or business system 20, which in many embodiments includes a local area network (LAN). In the description below, the enterprise or business system 20 can be referred to as an enterprise network 20. It will be appreciated that the enterprise network 20 can include more than one network and can be located in multiple geographic areas in some embodiments.

The enterprise network 20 can be operatively connected, often through a firewall 22, to a wide area network (WAN) 30, such as the Internet. The enterprise network 20 can also be operatively connected to a public switched telephone network (PSTN) 40 via direct inward dialing (DID) trunks or primary rate interface (PRI) trunks.

The enterprise network 20 can also communicate with a public land mobile network (PLMN) 50, which can also be referred to as a wireless wide area network (WWAN) or, in some cases, a cellular network. The operative connection with the PLMN 50 can be made via a relay 26, as understood in the art.

The enterprise network 20 can also provide a wireless local area network (WLAN) 32a featuring wireless access points. Other WLANs 32 can exist outside the enterprise network 20. For example, WLAN 32b can be operatively connected to WAN 30.

The system 10 can include a number of enterprise-associated mobile devices 11 (only one shown). The mobile devices 11 can include devices equipped with communications modules for cellular communication through the PLMN 50, mobile devices equipped for Wi-Fi communications over one of the WLANs 32, or dual-mode devices capable of both cellular and data communications. WLANs 32 can be configured in accordance with one of the IEEE 802.11 specifications.

It will be understood by a person with ordinary skill in the art that the mobile devices 11 include one or more radio transceivers and associated processing hardware and software to enable wireless communications with the PLMN 50 and/or one of the WLANs 32. In various embodiments, the PLMN 50 and mobile devices 11 can be configured to operate in compliance with any one or more of a number of wireless protocols, including GSM, GPRS, CDMA, EDGE, UMTS, EvDO, HSPA, 3GPP, or a variety of others. It will be appreciated that the mobile device 11 can roam within the PLMN 50 and across PLMNs, in a known manner, as the user moves. In some instances, the dual-mode mobile devices 11 and/or the enterprise network 20 are configured to facilitate roaming between the PLMN 50 and a WLAN 32, and are thus capable of seamlessly transferring sessions (such as voice calls) from an operative connection with the cellular interface of the dual-mode device 11 to the WLAN 32 interface of the dual-mode device 11, and vice versa.

The mobile devices 11 can consist of various types of communication devices. Such mobile devices 11 can include "Class A" devices, which are able to function continuously as dual-mode devices, capable of both media and data communications. Mobile devices 11 can also include "non-Class A" devices, which can function as dual-mode devices for initialization or prior to an operative connection with the enterprise communications platform 14, but can lose data functionality once a media session (e.g., voice call) is established. The enterprise network 20 can also include additional client devices which are voice-only or media-only devices, which can be digital or analog for communication with the PSTN or PLMN, and which need not have data capabilities (herein referred to as "voice-only" or "media-only" devices). In other embodiments, the mobile devices 11 can include any suitable client device configured with the communications functionality described herein, and can, for example, include computer devices, relays, proxies, gateways and any appropriate User Agents (as defined in SIP).

The enterprise network 20 typically includes a number of networked servers, computers, and other devices. For example, the enterprise network 20 can operatively connect one or more desktop or laptop computers 15 (one shown). The operative connection can be wired or wireless in some embodiments. The enterprise network 20 can also operatively connect to one or more digital telephone sets 17 (one shown).

The enterprise network 20 can include one or more mail servers, such as mail server 24, for coordinating the transmission, storage, and receipt of electronic messages for client devices operating within the enterprise network 20. Typical mail servers include the Microsoft Exchange Server™ and the IBM Lotus Domino™ server. Each user within the enterprise typically has at least one user account within the enterprise network 20. Associated with each user account is message address information, such as an e-mail address. Messages addressed to a user message address are stored on the enterprise network 20 in the mail server 24. The messages can be retrieved by the user using a messaging application, such as an e-mail client application. The messaging application can be operating on a user's computer 15 operatively connected to the enterprise network 20 within the enterprise. In some embodiments, the user can be permitted to access stored messages using a remote computer, for example at another location via the WAN 30 using a VPN connection. Using the messaging application, the user can also compose and send messages addressed to others, within or outside the enterprise network 20. The messaging application causes the mail server 24 to send a composed message to the addressee, often via the WAN 30.

The relay 26 serves to route messages received over the PLMN 50 from the mobile device 11 to the corresponding enterprise network 20. The relay 26 also pushes messages from the enterprise network 20 to the mobile device 11 via the PLMN 50.

The enterprise network 20 also includes an enterprise server 12. Generally, the enterprise server 12 is configured to collectively serve the needs of the enterprise network 20, for example to provide and/or synchronize messaging, contacts and calendaring information between servers, desktop workstations 15, and mobile devices 11. Together with the relay 26, the enterprise server 12 functions to redirect or relay incoming e-mail messages addressed to a user's e-mail address within the enterprise network 20 to the user's mobile device 11 and to relay incoming e-mail messages composed and sent via the mobile device 11 out to the intended recipients within the WAN 30 or elsewhere. The enterprise server 12 and relay 26 together facilitate "push" e-mail service for the mobile device 11 enabling the user to send and receive e-mail messages using the mobile device 11 as though the user were operatively connected to an e-mail client within the enterprise network 20 using the user's enterprise-related e-mail address, for example on computer 15.

As is typical in many enterprises, the enterprise network 20 includes a Private Branch eXchange (although in various embodiments the PBX can be a standard PBX or an IP-PBX, for simplicity the description below uses the term PBX to refer to both) 16 having an operative connection with the PSTN 40 for routing incoming and outgoing voice calls for the enterprise. The PBX 16 is operatively connected to the PSTN 40 via DID trunks or PRI trunks, for example. The PBX 16 can use ISDN signaling protocols for setting up and tearing down circuit-switched connections through the PSTN 40 and related signaling and communications. In some embodiments, the PBX 16 can be operatively connected to one or more conventional analog telephones 19. The PBX 16 is also operatively connected to the enterprise network 20 and, through it, to telephone terminal devices, such as digital telephone sets 17, softphones operating on computers 15, etc. Within the enterprise, each individual can have an associated extension number, sometimes referred to as a PNP (private numbering plan), or direct dial phone number. Calls outgoing from the PBX 16 to the PSTN 40 or incoming from the PSTN 40 to the PBX 16 are typically circuit-switched calls. Within the enterprise, e.g. between the PBX 16 and terminal devices, voice calls are often packet-switched calls, for example Voice-over-IP (VoIP) calls.

The enterprise network 20 can further include a Service Management Platform (SMP) 18 for performing some aspects of messaging or session control, like call control and advanced call processing features. The SMP 18 can, in some cases, also perform some media handling. Collectively the SMP 18 and PBX 16 can be referred to as the enterprise communications platform, generally designated 14. It will be appreciated that the enterprise communications platform 14 and, in particular, the SMP 18, is implemented on one or more servers having suitable communications interfaces for operatively connecting to and communicating with the PBX 16 and/or DID/PRI trunks. Although the SMP 18 can be implemented on a stand-alone server, it will be appreciated that it can be implemented into an existing control agent/server as a logical software component. As will be described below, the SMP 18 can be implemented as a multi-layer platform.

The enterprise communications platform 14 implements the switching to operatively connect session legs and can provide the conversion between, for example, a circuit-switched call and a VoIP call, or to operatively connect legs of other media sessions. In some embodiments, in the context of voice calls the enterprise communications platform 14 provides a number of additional functions including automated attendant, interactive voice response (IVR), call forwarding, voice mail, etc. It can also implement certain usage restrictions on enterprise users, such as blocking international calls or 1-900 calls. In many embodiments, Session Initiation Protocol (SIP) can be used to set-up, manage, and terminate media sessions for voice calls. Other protocols can also be employed by the enterprise communications platform 14, for example, Web Services, Computer Telephony Integration (CTI) protocol, Session Initiation Protocol for Instant Messaging and Presence Leveraging Extensions (SIMPLE), and various custom Application Programming Interfaces (APIs), as will be described in greater detail below.

One of the functions of the enterprise communications platform 14 is to extend the features of enterprise telephony to the mobile devices 11. For example, the enterprise communications platform 14 can allow the mobile device 11 to perform functions akin to those normally available on a standard office telephone, such as the digital telephone set 17 or analog telephone set 15. Example features can include direct extension dialing, enterprise voice mail, conferencing, call transfer, call park, etc.

Figure 2:
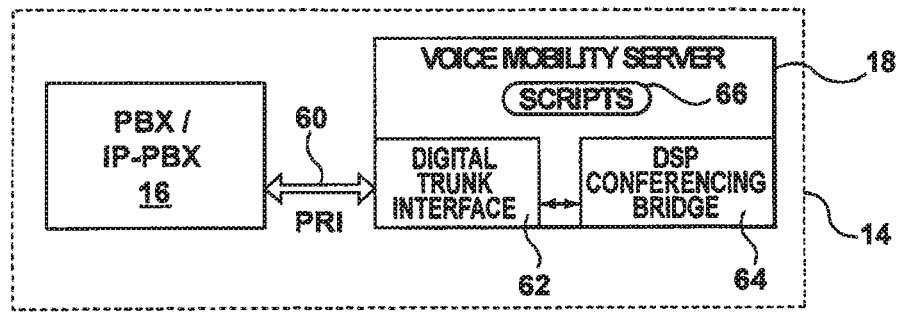
FIG. 2 shows, in block diagram form, further details of an embodiment of the enterprise communications platform.
Figure 3:
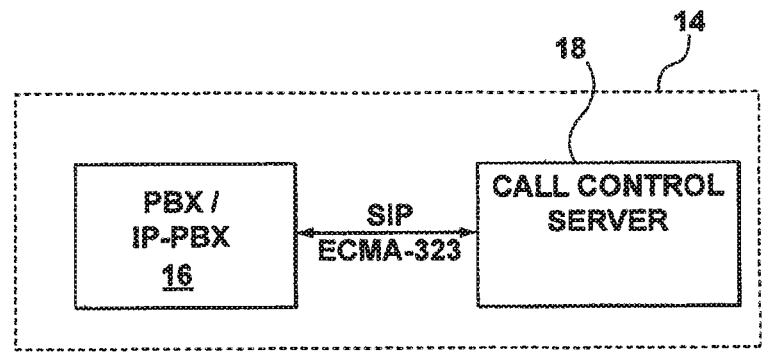
FIG. 3 shows another embodiment of the enterprise communications platform.
Figure 4:
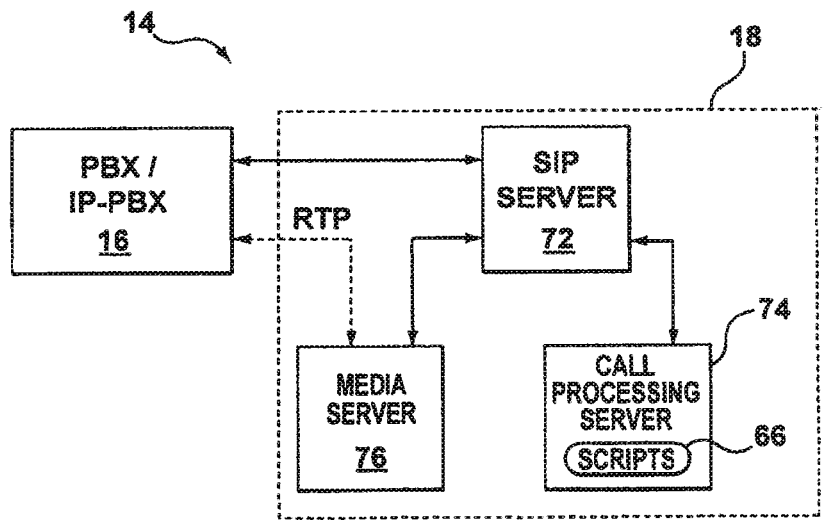
FIG. 4 shows yet another embodiment of the enterprise communications platform.

Reference is now made to FIGS. 2 to 4, which show example embodiments of the enterprise communications system 14. FIG. 2 illustrates an embodiment intended for use in a circuit-switched TDM context. The PBX 16 is coupled to the SMP 18 via PRI operative connection 60 or other suitable digital trunk. In some embodiments, the PRI operative connection 60 can include a first PRI operative connection, a second PRI operative connection, and a channel service unit (CSU), wherein the CSU is a mechanism for operatively connecting computing devices to digital mediums in a manner that allows for the retiming and regeneration of incoming signals. It will be appreciated that there can be additional or alternative operative connections between the PBX 16 and the SMP 18.

In this embodiment, the SMP 18 assumes control over both call processing and the media itself. This architecture can be referred to as "First Party Call Control". Many of the media handling functions normally implemented by the PBX 16 are handled by the SMP 18 in this architecture. Incoming calls addressed to any extension or direct dial number within the enterprise, for example, are always first routed to the SMP 18. Thereafter, a call leg is established from the SMP 18 to the called party within the enterprise, and the two legs are bridged. Accordingly, the SMP 18 includes a digital trunk interface 62 and a digital signal processing (DSP) conferencing bridge 64. The DSP conferencing bridge 64 performs the bridging of calls for implementation of various call features, such as conferencing, call transfer, etc. The digital trunk interface 62 can be implemented as a plurality of telephonic cards, e.g. Intel Dialogic cards, interoperatively connected by a bus and operating under the control of a processor. The digital trunk interface 62 can also be partly implemented using a processor module such as, for example, a Host Media Processing (HMP) processor.

The SMP 18 can include various scripts 66 for managing call processing. The scripts 66 are implemented as software modules, routines, functions, etc., stored in non-volatile memory and executed by the processor of the SMP 18. The scripts 66 can implement call flow logic, business logic, user preferences, call service processes, and various feature applications.

FIG. 3 shows another embodiment in which the PBX 16 performs the functions of terminating and/or bridging media streams, but call control functions are largely handled by the SMP 18. In this embodiment, the SMP 18 can be referred to as a call control server 18. This architecture can be referred to as "Third-Party Call Control".

The call control server 18 is coupled to the PBX 16, for example through the LAN, enabling packet-based communications and, more specifically, IP-based communications. In one embodiment, communications between the PBX 16 and the call control server 18 are carried out in accordance with SIP. In other words, the call control server 18 uses SIP-based communications to manage the set up, tear down, and control of media handled by the PBX 16. In one example embodiment, the call control server 18 can employ a communications protocol conforming to the ECMA-269 or ECMA-323 standards for Computer Supported Telecommunications Applications (CSTA).

FIG. 4 shows yet another embodiment of the enterprise communications system 14. This embodiment reflects the adaptation of an existing set of call processing scripts to an architecture that relies on third-party call control, with separate call control and media handling. The SMP 18 includes a call processing server 74. The call processing server 74 includes the scripts or other programming constructs for performing call handling functions. The SMP 18 also includes a SIP server 72 and a media server 76. The separate SIP server 72 and media server 76 logically separate the call control from media handling. The SIP server 72 interacts with the call processing server 74 using a computer-implemented communications handling protocol, such as one of the ECMA-269 or ECMA-323 standards. These standards prescribe XML based messaging for implementing Computer Supported Telecommunications Applications (CSTA).

The SIP server 72 interacts with the media server 76 using SIP-based media handling commands. For example, the SIP server 72 and media server 76 can communicate using Media Server Markup Language (MSML) as defined in IETF document Saleem A., "Media Server Markup Language", Internet Draft, draft-saleem-msml-07, Aug. 7, 2008. The media server 76 can be configured to perform Host Media Processing (HMP).

Other architectures or configurations for the enterprise communications system 14 will be appreciated by those ordinarily skilled in the art. For example, in example embodiments the service management platform 18 can be separate from the PBX 16; or the service management platform 18 can include a cloud-based system.

Figure 5:
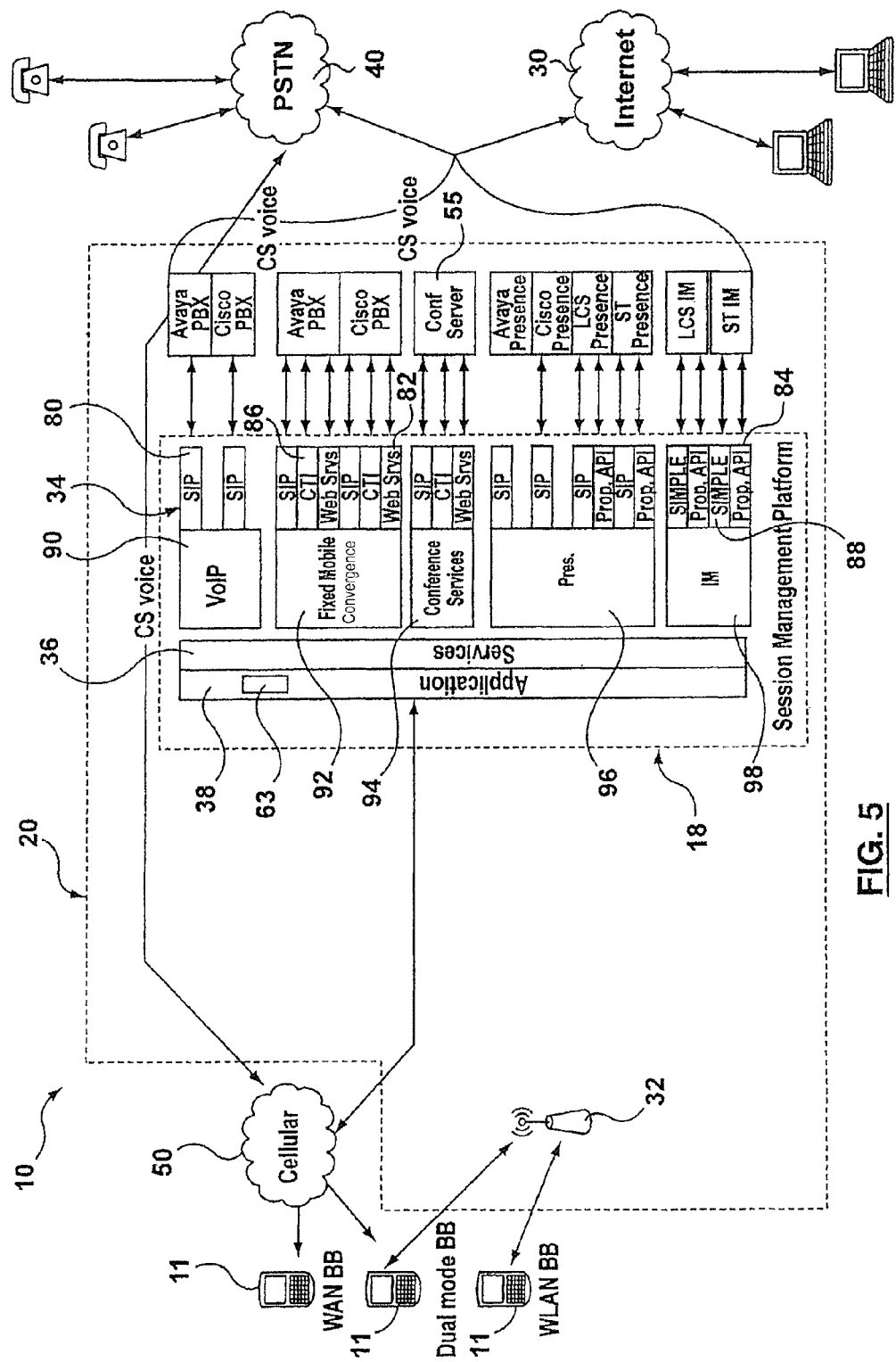
FIG. 5 shows further details of the enterprise communications platform of FIG. 3.

Reference is now made to FIG. 5, which shows another embodiment of the enterprise communications system 14 with a Third Party Call Control architecture. In this embodiment, the SMP 18 is a multi-layer platform that includes a protocol layer 34, a services layer 36 and an application layer 38. The protocol layer 34 includes a plurality of interface protocols configured for enabling operation of corresponding applications in the application layer 38. The services layer 36 includes a plurality of services that can be leveraged by the interface protocols to create richer applications. Finally, the application layer 38 includes a plurality of applications that are exposed out to the communication devices and that leverage corresponding ones of the services and interface protocols for enabling the applications.

Specifically, the protocol layer 34 preferably includes protocols which allow media to be controlled separate from data.

For example, the protocol layer 34 can include, among other things, a Session Initiation Protocol or SIP 80, a Web Services protocol 82, an Application Programming Interface or API 84, a Computer Telephony Integration protocol or CTI 86, and a Session Initiation Protocol for Instant Messaging and Presence Leveraging Extensions or SIMPLE protocol 88. It is contemplated that the interface protocols 80-88 are plug-ins that can interface directly with corresponding servers in the enterprise network 20, which will be further described below.

Although SIP 80 can be utilized, it is appreciated that the system 10 can operate using the above disclosed or additional protocols. As known by those of ordinary skill in the art, SIP is the IETF (Internet Engineering Task Force) standard for multimedia session management, and more specifically is an application-layer control protocol for establishing, maintaining, modifying and terminating multimedia sessions between two or more endpoints. As further known by those of ordinary skill in the art, the SIP protocol 80 includes two interfaces for signaling: SIP-Trunk (hereinafter referred to as "SIP-T") and SIP-Line (hereinafter referred to as "SIP-L"). Specifically, the SIP-T interface is utilized when the endpoint is a non-specific entity or not registered (i.e., when communicating between two network entities). In contrast, the SIP-L interface is utilized when the endpoint is registered (i.e., when dialing to a specific extension). SIP is defined in J. Rosenberg et al., "RFC 3261—Session Initiation Protocol" (June 2002), the contents of which are herein incorporated by reference.

The SMP 18 also includes a plurality of enablers, among other things, a VoIP enabler 90, a Fixed Mobile Convergence or FMC enabler 92, a conference services enabler 94, a presence enabler 96 and an Instant Messaging or IM enabler 98. Each of the enablers 90-98 are used by corresponding services in the services layer 36 that combine one or more of the enablers. Each of the applications in the application layer 38 is then combined with one or more of the services to perform the desired application. For example, a phone call service can use the VoIP or PBX enabler, and an emergency response application can use the phone call service, an Instant Messenger service, a video call service, an email service and/or a conference service.

The application layer 38 can include a conference services application 63 that, together with the conference services enabler 94, enables multiple communication devices (including desk telephones and personal computers) to participate in a conference call through use of a centralized conference server 55. As seen in FIG. 5, the conference server 55 is provided in the enterprise network 20 and is in communication with the conference services enabler 94 preferably through the SIP protocol 80, although it is recognized that additional protocols that control media separate from data can be appropriate, such as the Web Services protocol 82 or the CTI protocol 86. As will be described in further detail below, the conference call server 55 is configured for directing media and data streams to and from one or more communication devices (i.e., mobile devices 11, telephones 17, and computers 15).

Example conference call systems and methods in accordance with example embodiments will now be described, referring now to FIG. 6, which shows the system 10 when used or configured as a conference call system. As shown, the enterprise communications platform 14 includes the conference server 55 for providing conference call services for a number of client devices such as mobile devices 11, illustrated as one designated host device 11*a* and one or more participant devices 11*b*, 11*c*, 11*d*. The mobile devices 11 can collectively form a conference call group. The host device 11*a* is generally the mobile device 11 or associated user who schedules and hosts a conference call session, and can, for example, be permitted to perform such hosting functions as roll call, mute all, broadcast only, conference lock, etc. In some example embodiments, the conference call session cannot commence without the presence of the host device 11a.

The enterprise communications platform 14 and the associated conference server 55 can be used for generally executing conference call functions. As described above, in example embodiments, the enterprise communications platform 14 can include or be coupled to the media server 76 (FIG. 4), wherein the enterprise communications platform 14 controls the media handling and media sessions of the media server 76.

Figure 6:
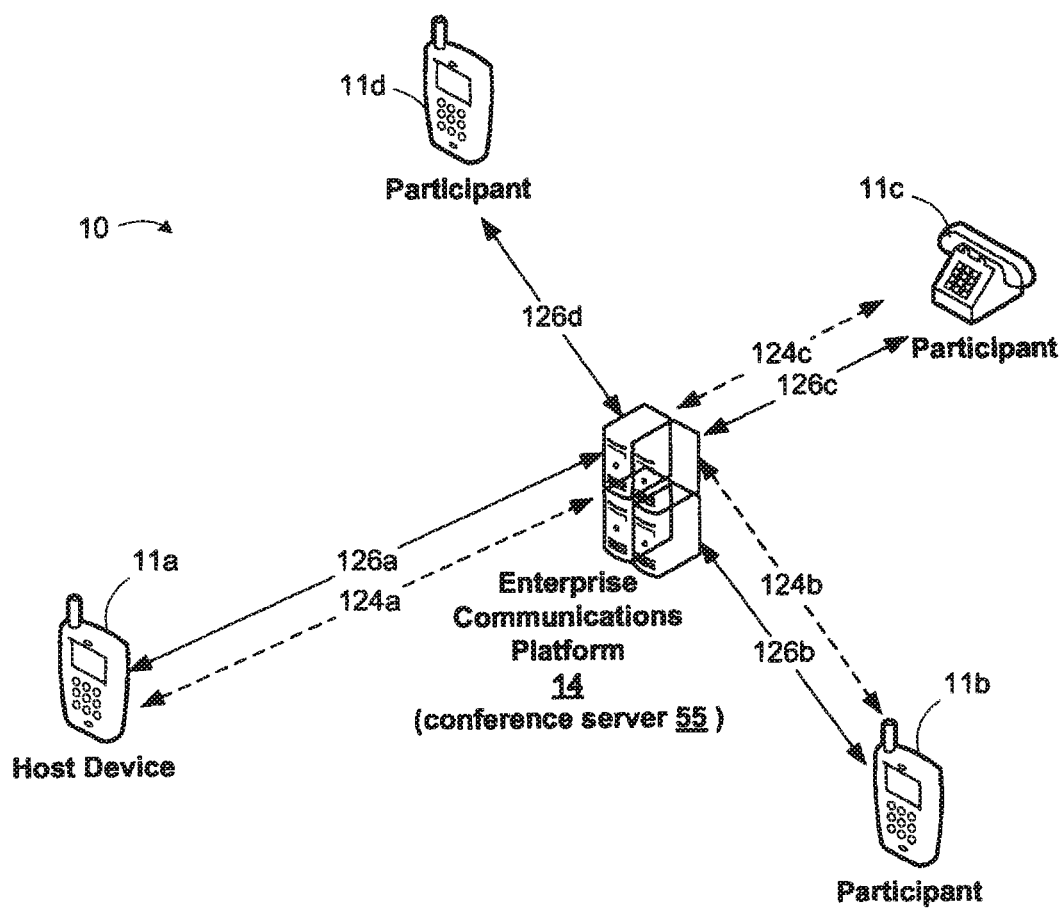
FIG. 6 shows, in block diagram form, a conference call system including the enterprise communications platform shown in FIG. 1 and client devices.

Referring still to FIG. 6, in order to implement some of the conference call functions described herein, the enterprise communications platform 14 can communicate with the mobile devices 11 by way of media sessions and/or control sessions. Specifically, as shown in FIG. 6, the mobile devices 11 communicate via media sessions 126 (shown as solid lines) and control sessions 124 (shown as dashed lines to distinguish from the media sessions 126). For example, the designated host device 11a communicates via media session 126a and control session 124a. Participant device 11b communicates via media session 126b and control session 124b. Participant device 11c communicates via media session 126c and control session 124c. In some embodiments, as shown, the participant device 11d can merely communicate via media session 126d over the PLMN 50 (FIG. 1) or PSTN 40 (FIG. 1) only (without an associated control session).

In some example embodiments, the media sessions 126 can be facilitated by the enterprise communications platform 14 by way of Real-time Transport Protocol (RTP) media sessions, and can include voice calls, video calls, circuit-switched calls or VoIP calls. In order to generate or establish a conference call session, the enterprise communications platform 14 operatively connects or links at least some of the call legs of each media session 126. The particular methods and processes for operatively connecting of media sessions 126 into a conference call session would be understood by those skilled in the art, which can, for example, be implemented by media shuffling or SDP (Session Description Protocol) media shuffling, etc.

In some example embodiments, a data connection (e.g. the same data connection as used by the control sessions 124) can be further used to provide additional data sharing between mobile devices 11. For example, during a conference call, the host mobile device 11a can provide or transfer a data file to the remaining mobile devices 11. Data sharing can also include Web Services or sharing of presentation content.

In some example embodiments, during a conference call session, the enterprise communications platform 14 can receive Global Positioning System (GPS) information from at least some of the participant devices 11, and can send the received GPS information to the devices 11, to provide location based positioning services between the devices 11.

Figure 7:
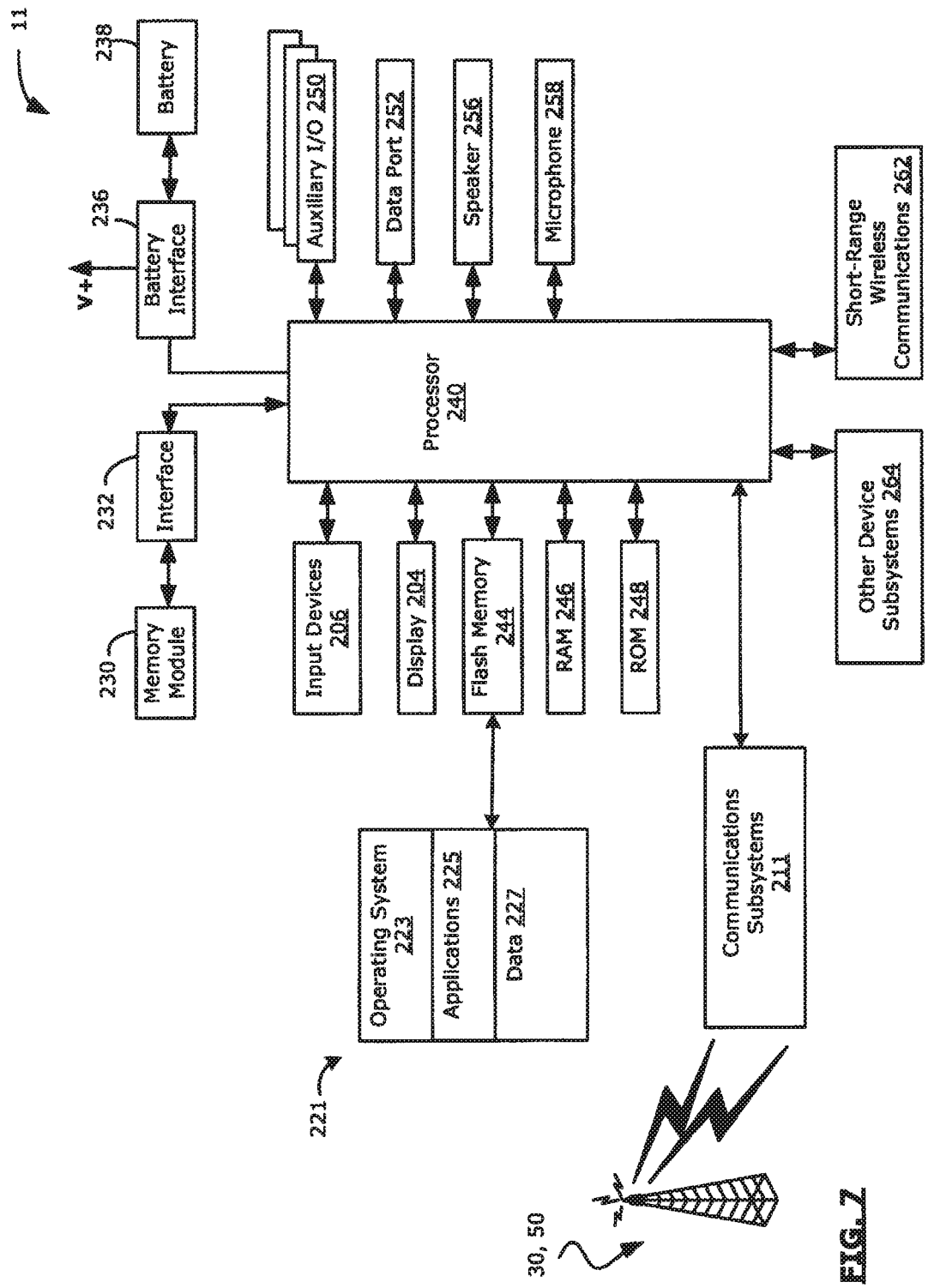
FIG. 7 shows a block diagram illustrating a mobile communication device in accordance with an example embodiment.

Reference is now made to FIG. 7 which illustrates in detail a mobile device 11 in which example embodiments can be applied. The mobile device 11 is a two-way communication device having data and voice communication capabilities, and the capability to communicate with other computer systems, for example, via the Internet. Depending on the functionality provided by the mobile device 11, in various embodiments the mobile device 11 can be a handheld device, a multiple-mode communication device configured for both data and voice communication, a smartphone, a mobile telephone or a PDA (personal digital assistant) enabled for wireless communication.

The mobile device 11 includes a rigid case (not shown) housing the components of the mobile device 11. The internal components of the mobile device 11 can, for example, be constructed on a printed circuit board (PCB). The description of the mobile device 11 herein mentions a number of specific components and subsystems. Although these components and subsystems can be realized as discrete elements, the functions of the components and subsystems can also be realized by integrating, combining, or packaging one or more elements in any suitable fashion. The mobile device 11 includes a controller comprising at least one processor 240 (such as a microprocessor) which controls the overall operation of the mobile device 11. The processor 240 interacts with device subsystems such as a wireless communication subsystem 211 for exchanging radio frequency signals with the wireless network (e.g. WAN 30 and/or PLMN 50) to perform communication functions. The processor 240 interacts with additional device subsystems including a display 204 such as a liquid crystal display (LCD) screen or any other appropriate display, input devices 206 such as a keyboard and control buttons, persistent memory 244, random access memory (RAM) 246, read only memory (ROM) 248, auxiliary input/output (I/O) subsystems 250, data port 252 such as a conventional serial data port or a Universal Serial Bus (USB) data port, speaker 256, microphone 258, short-range communication subsystem 262 (which can employ any appropriate wireless (e.g., RF), optical, or other short range communications technology), and other device subsystems generally designated as 264. Some of the subsystems shown in FIG. 2 perform communication-related functions, whereas other subsystems can provide "resident" or on-device functions.

Display 204 can be realized as a touch-screen display in some embodiments. The touch-screen display can be constructed using a touch-sensitive input surface operatively connected to an electronic controller and which overlays the visible element of display 204. The touch-sensitive overlay and the electronic controller provide a touch-sensitive input device and the processor 240 interacts with the touch-sensitive overlay via the electronic controller.

The wireless communication subsystem 211 includes one or more communication systems for communicating with wireless WAN base stations 30 and wireless LAN access points 32 within the wireless network. The particular design of the wireless communication subsystem 211 depends on the wireless network in which mobile device 11 is intended to operate. The mobile device 11 can send and receive communication signals over the wireless network after the required network registration or activation procedures have been completed.

The processor 240 operates under stored program control and executes software modules 221 stored in memory such as persistent memory 244 or ROM 248. The processor 240 can execute code means or instructions. ROM 248 can contain data, program instructions or both. Persistent memory 244 can contain data, program instructions or both, in some embodiments is rewritable under control of processor 240, and can be realized using any appropriate persistent memory technology, including EEPROM, EAROM, FLASH, and the like. As illustrated in FIG. 2, the software modules 221 comprise operating system software 223 and software applications 225.

Software modules 221 or parts thereof can be temporarily loaded into volatile memory such as the RAM 246. The RAM 246 is used for storing runtime data variables and other types of data or information, as will be apparent to those skilled in the art. Although specific functions are described for various types of memory, this is merely one example, and those skilled in the art will appreciate that a different assignment of functions to types of memory could also be used.

The software applications 225 can further include a range of applications, including, for example, an e-mail messaging application, address book, calendar application, notepad application, Internet browser application, voice communication (i.e., telephony) application, mapping application, or a media player application, or any combination thereof. Each of the software applications 225 can include layout information defining the placement of particular fields and graphic elements (e.g., text fields, input fields, icons, etc.) in the user interface (i.e., the display 204) according to the application.

The modules 221 can further include a Global Positioning System (GPS) module or application which is configured for detection of a geographical position of the device 11, for example by correlating existing satellites. The GPS module can also receive from the enterprise communications platform 14 the geographical positions of the other devices 11.

In some embodiments, the auxiliary input/output (I/O) subsystems 250 can comprise an external communication link or interface, for example, an Ethernet connection. The auxiliary I/O subsystems 250 can further comprise one or more input devices, including a pointing or navigational tool such as a clickable trackball or scroll wheel or thumbwheel, or one or more output devices, including a mechanical transducer such as a vibrator for providing vibratory notifications in response to various events on the mobile device 11 (e.g., receipt of an electronic message or incoming phone call), or for other purposes such as haptic feedback (touch feedback).

In some embodiments, the mobile device 11 also includes one or more removable memory modules 230 (typically comprising FLASH memory) and one or more memory module interfaces 232. Among possible functions of the removable memory module 230 is to store information used to identify or authenticate a user or the user's account to wireless network (e.g. WAN 30 and/or PLMN 50). For example, in conjunction with certain types of wireless networks, including GSM and successor networks, the removable memory module 230 is referred to as a Subscriber Identity Module or SIM. The memory module 230 is inserted in or operatively connected to the memory module interface 232 of the mobile device 11 in order to operate in conjunction with the wireless network.

The mobile device 11 stores data 227 in a persistent memory 244. In various embodiments, the data 227 includes service data comprising information required by the mobile device 11 to establish and maintain communication with the wireless network (e.g. WAN 30 and/or PLMN 50). The data 227 can also include, for example, scheduling and connection information for operatively connecting to a scheduled conference call.

The mobile device 11 also includes a battery 238 which furnishes energy for operating the mobile device 11. The battery can be coupled to the electrical circuitry of mobile device 11 through a battery interface 236, which can manage such functions as charging the battery from an external power source (not shown) and the distribution of energy to various loads within or operatively connected to the mobile device 11. Short-range communication subsystem 262 is an additional optional component which provides for communication between the mobile device 11 and different systems or devices, which need not necessarily be similar devices. For example, the short-range communication subsystem 262 can include an infrared device and associated circuits and components, or a wireless bus protocol compliant communication mechanism such as a BLUETOOTH communication module to provide for communication with similarly-enabled systems and devices.

A predetermined set of applications that control basic device operations, including data and possibly voice communication applications will normally be installed on the mobile device 11 during or after manufacture. Additional applications and/or upgrades to the operating system software 223 or software applications 225 can also be loaded onto the mobile device 11 through the wireless network (e.g. WAN 30 and/or PLMN 50), the auxiliary I/O subsystem 250, the data port 252, the short-range communication subsystem 262, or other suitable subsystem such as 264. The downloaded programs or code modules can be permanently installed, for example, written into the program memory (e.g., the persistent memory 244), or written into and executed from the RAM 246 for execution by the processor 240 at runtime.

The mobile device 11 can provide three principal modes of communication: a data communication mode, an optional voice communication mode, and an optional video communication mode. In the data communication mode, a received data signal such as a text message, an e-mail message, Web page download, or an image file will be processed by the wireless communication subsystem 211 and input to the processor 240 for further processing. For example, a downloaded Web page can be further processed by a browser application or an e-mail message can be processed by an e-mail message messaging application and output to the display 204. A user of the mobile device 11 can also compose data items, such as e-mail messages, for example, using the input devices in conjunction with the display 204. These composed items can be transmitted through the wireless communication subsystem 211 over the wireless network (e.g. WAN 30 and/or PLMN 50). In the voice communication mode, the mobile device 11 provides telephony functions and operates as a typical cellular phone. In the video communication mode, the mobile device 11 provides transcribing functions during a video conferencing session, including at least one camera.

Figure 10:
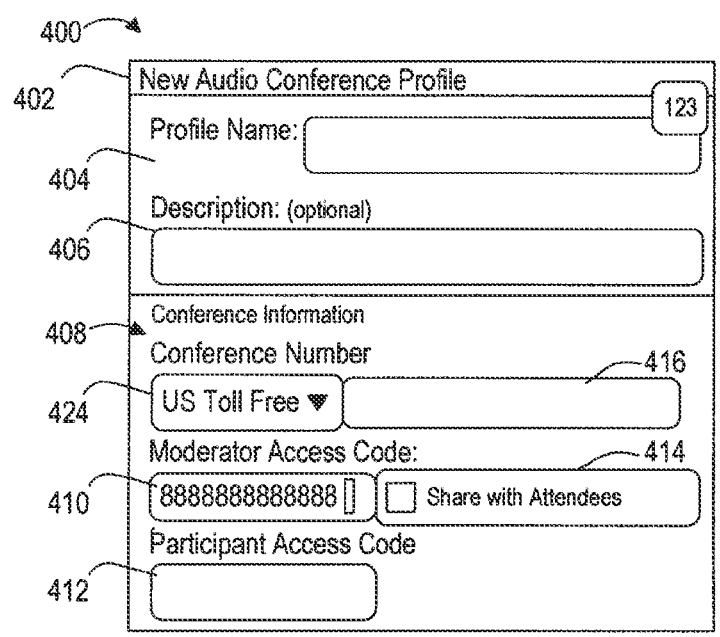
FIG. 10 shows an example user interface for creating a conference call profile, in accordance with an example embodiment.

Reference is now made to FIG. 10, which shows a conference profile interface 400 in accordance with a conference profiles feature, in accordance with some example embodiments. This can be implemented by a conference call application, which can be an add-on, plug-in or app for a calendar application. Generally, in some example embodiments, the interface 400 can be used for creating and editing conference profiles. As shown in the title bar 402 of FIG. 10, a "New Audio Conference Profile" can be created and stored in memory.

The profiles feature can provide meeting organizers the option to save conference information into profiles. When creating meetings using the conference call application, the host organizers can readily populate the conference information for the meeting by selecting a profile for that meeting. All or some of the conference call information can be automatically inserted into the meeting invitation. In the presently described embodiment, the profile includes an indicator to optionally exclude sending moderator information such as the moderator access code 410 to some or all of the invited participants.

Referring still to FIG. 10, the interface 400 can be used for editing conference call information of the conference call profile. As shown, the fields include Profile Name 404, Description 406, Conference Number 408, Moderator Access Code 410, and Participant Access Code 412. These fields can be edited by the user through the interface 400.

The interface 400 also includes a checkbox 414 for selecting whether the moderator access code 410 is to be shared with attendees. The checkbox 414 when deselected is used as an indicator or tag, which is stored in memory of the device 11a. For example, the indicator can be toggled as on or off. In other example embodiments, the moderator access code 410 is masked by default, unless unchecked by the user. In other embodiments, selection of a checkbox with suitable wording is used as the indicator to indicate hiding or masking the moderator access code 410. In some example embodiments, the indicator is automatically generated by the host device 11*a*. In some other example embodiments, other moderator information such as the geographic location of the moderator, is masked or excluded.

Some example embodiments can support multiple addresses, such as multiple phone numbers and/or address links. For example, each of the multiple addresses can terminate onto the enterprise communications platform 14. In some example embodiments, conference call application can support a plurality of addresses for the Contact Number field which are used to contact the enterprise communications platform 14. In some example embodiments, once the first Conference Number 408 address field ("US Toll Free" field 416 in this example) is populated, another Conference Number 408 field is displayed for editing. The particular label for the "US Toll Free" can be changed to other types of operative connections by selecting a menu 424.

Figure 11:
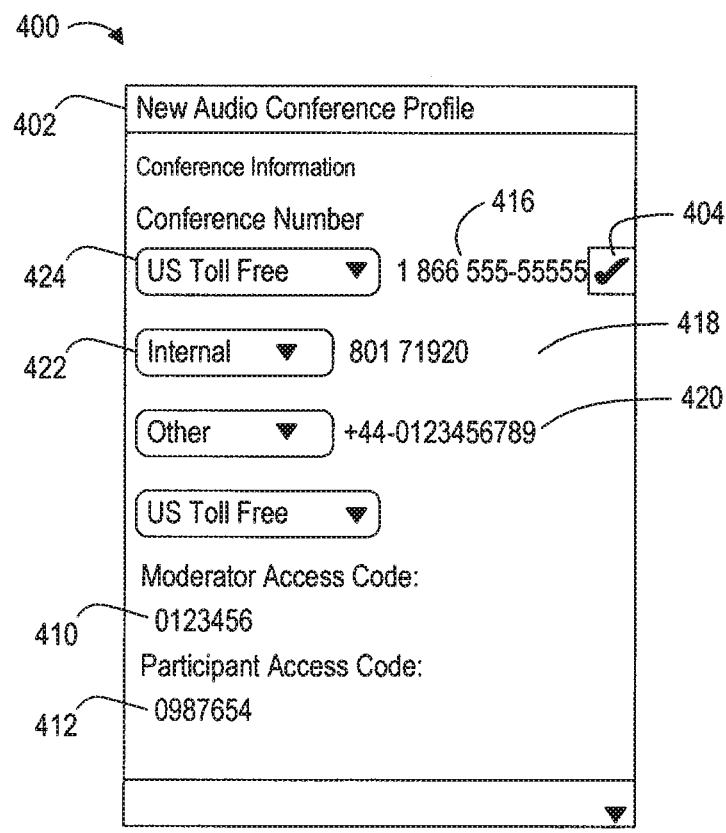
FIG. 11 shows the example user interface of FIG. 10 in another operation.

Thus, reference is now made to FIG. 11, which shows the interface 400 in a further mode of operation. As shown in FIG. 11, the interface 400 includes additional Contact Number fields, such as "Internal" 418 and "Other" 420, as shown. For example, once the US Toll Free field 416 is populated, the next address field appears, in this example "Internal" 418. The default type of operative connection can be "US Toll Free"; thus, in some embodiments the particular type of operative connection can be relabeled from "US Toll Free" to "Internal" using a menu 422. Once "Internal" 418 is filled, the next address field appears, in this example labeled as "Other" 420. Once the "Other" 420 is filled, a new default field appears, shown again as a default "US Toll Free".

Note that, in some example embodiments, the conference profile can also support more than one participant access code (not shown).

Figure 15:
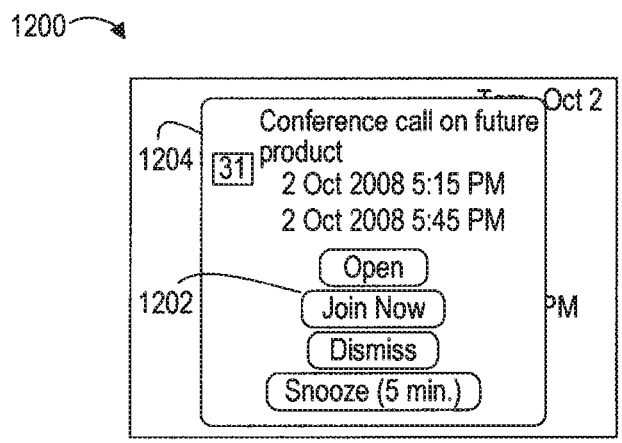
FIG. 15 shows a reminder interface for a scheduled conference call session, in accordance with an example embodiment.

Reference is now briefly made to FIG. 15, which shows a reminder interface 1200 which is displayed at a time of a conference call session, or a specified time beforehand. In some example embodiments, the conference call application can include a join now feature. In some example embodiments the join now feature includes a default join option, shown as a "Join Now" button 1202, for establishing the scheduled conference call session using a default address. Once the time of that meeting arrives, or a predetermined time beforehand, the "Join Now" button 1202 can be displayed on the device 11 on a popup reminder interface 1204. In example embodiments, the automatic discovery feature is used to determine whether a particular address is to be associated with the join now feature. When this is performed, the selection of the "Join Now" button 1202 would result in the device 11 automatically operatively connecting to the enterprise communications platform 14 using the identified address. The address can be a phone number and conference access code, or an address link such as an Internet address.

Referring again to FIG. 11, in some example embodiments, the "Join Now" button can be specifically assigned to a specific number or address at this time, to be used as the default join option for the particular profile. The host device 11*a* can store a tag, represented by checkmark 404, which represents the particular phone number (US Toll Free in this example) which is the default phone number assigned to the join now option (e.g. join now button 1202 (shown in FIG. 15)). The particular tag or checkmark 404 can be edited or changed to one of the other Conference Number fields through the interface 400.

Figure 9:
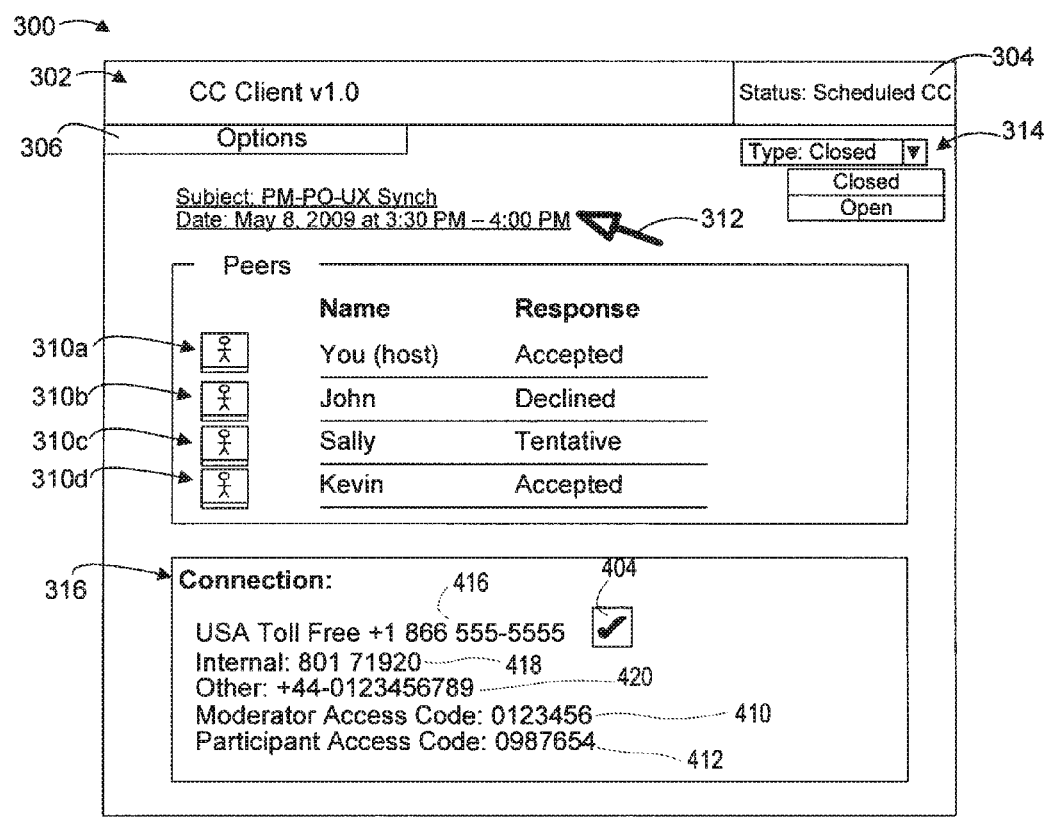
FIG. 9 shows a user interface as displayed on a mobile communication device, for scheduling of a calendar meeting for a conference call, in accordance with an example embodiment.

Reference is now made to FIG. 9, which shows an example user interface 300 displayed on the display 204 for scheduling a conference call, in accordance with an example embodiment. In the example embodiment shown, the user interface 300 is for example implemented by a conference call application (as a stand-alone or in combination with other applications) resident on the host device 11*a*, which can be an add-on, plug-in or app for a calendar application. The user interface 300 can form part of a conference call session scheduling process.

Still referring to FIG. 9, the user interface 300 can be edited to schedule a conference call session having a subject and which is to occur at a scheduled time and date. For example, the time and date of the scheduled conference call session can be stored within the conference call application or a calendar application. For example, the scheduled conference call has a subject field of "PM-PO-UX Synch." and has a scheduled date field of "May 8, 2009 at 3:30 PM-4:00 PM". The user interface 300 can be manually triggered by launching and subsequently operating the conference call application.

As shown in FIG. 9, the user interface 300 also includes an options menu 306 to perform functions such as editing the existing scheduled conference call, scheduling new conference calls, and inviting new participants. During the conference call scheduling process, the conference call scheduling information is sent from the host device 11*a* to the enterprise communications platform 14, which stores the information in a memory. In some example embodiments, the host mobile device 11*a* sends an invitation message directly or indirectly to the recipient invitee client devices 11. In some example embodiments, the host mobile device 11*a* receives a response to the invitation message directly or indirectly from the invitee client devices 11. The host mobile device 11*a* can update the enterprise communications platform 14 in such example embodiments.

At the time of the scheduled conference call, or a specified time beforehand, the enterprise communications platform 14 can contact each of the devices 11 to join the media sessions together. In example embodiments, the devices 11 can also dial or link into the enterprise communications platform 14 using dialing or address link information received during scheduling.

As shown in FIG. 9, the user interface 300 includes a title bar 302, a status icon 304, an options menu 306, and participant icons 310*a*-310*d* (each or individually 310) which display the status of each participant for the conference call. The participant icons 310 can, for example, be a photo or avatar of the individual user. A cursor 312 is also shown for indicating which item(s) on the user interface 300 are to be selected (e.g., controllable by a user input device such as a touchscreen, touch scrollball or mouse). The status icon 304 displays the present status of the conference call, for example "Scheduled CC" (Conference Call) as shown.

Referring now to the participant icons 310, in the example shown, the user interface 300 is displayed on the host device 11*a*, indicated as "You-Host" as shown in icon 310*a*. The participant icon 310*b* associated with "John" is indicated as "Declined". The participant icon 310*b* associated with "Sally" is indicated as "Tentative". The participant icon 310*d* associated with "Kevin" is indicated as "Accepted." Contact information such as e-mail address or phone number for the participants can be pre-stored in association with the participant names (or can be manually entered, as appropriate). The status of each participant icon 310 can also be shown, for example, as Accepted, Tentative, or Declined.

As shown in FIG. 9, in some example embodiments the host device 11a can also select a menu 314 to designate the scheduled conference call as a "closed" conference call. In a "closed" call, only the specified or eligible participant devices 11 designated by the host device 11a can join the call. Additionally, for example, only a specified number of participants can join the call. In some example embodiments, in a "closed" call further authentication of those participant devices 11 can be performed when attempting to access the scheduled conference call. As shown, the host device I la also has the option to use the menu 314 to set the scheduled conference call as an "open" conference call, wherein any participant device 11 (designated as eligible or not) can join.

As shown, the Connection fields 316 include various addresses for operatively connecting to the enterprise communications platform 14. In some example embodiments, the Connection fields 316 can be populated from a profile with one or more phone numbers, and moderator or participant access codes, for operatively connecting to the enterprise communications platform 14. In the example shown, the phone numbers shown are USA Toll Free 416, Internal extension 418, and Other 420. Additional addresses can also be populated within the Connection fields 316, such as an Internet, Intranet, or SIP address link (not shown). Some of the information in the Connection fields graphical user interface 316 can be auto-populated with address information retrieved from a conference profile stored in memory. The moderator access code 410 and the participant access code 412 can also be contained in the Connection fields 316.

Figure 12:
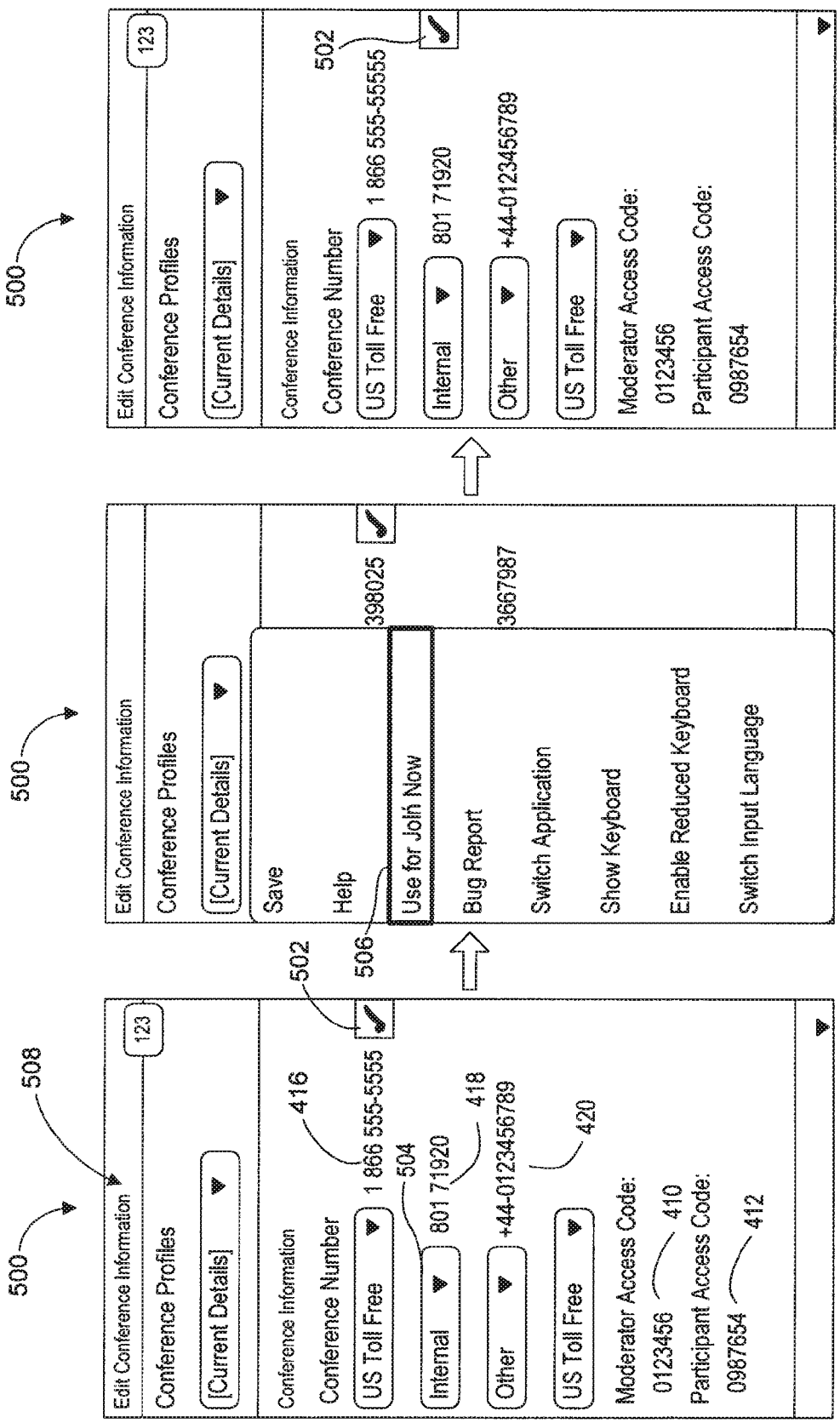
FIG. 12A shows an example user interface for configuring conference call scheduling information, in accordance with an example embodiment.
FIG. 12B shows the example user interface of FIG. 10A in another operation.
FIG. 12C shows the example user interface of FIG. 10A in another operation.

Reference is now made to FIG. 12A, which shows an interface 500 in accordance with an example embodiment. In some example embodiments, the interface 500 is displayed as a consequence of selection of the options menu 306 (or a sub-menu thereof) from FIG. 9.

As illustrated in the interface 500, the saved conference profile can be accessed to populate at least some of the conference call scheduling fields. For example, a desired profile can be selected from a Conference Profile option or Conference Profile drop-down menu 508. Once selected, at least some of the address fields and the access codes can be automatically populated. As shown, at least some of the US Toll Free 416, Internal 418, Other 420, moderator access code 410, and participant access code 412 are automatically retrieved and copied into respective fields. These fields can be further edited by the user through the interface 500. Accordingly, the profile can be used as a starting point for scheduling a conference call in some example embodiments.

In some example embodiments, the host device 11a can also store a tag, represented by checkmark 502, which represents the particular phone number (US Toll Free 416 in this example) which is the default phone number assigned to the join now option (e.g. join now button 1202 (shown in FIG. 15)). Through the interface 500, the user can edit or select which address or phone number is to be used for the join now option.

Thus, reference is made to FIGS. 12B and 12C, which illustrate how the interface 500 can be used to select a different phone number, for example Internal 418, as the default phone number assigned to the join now option. As shown in FIGS. 12A and 12B, a drop-down menu 504 for Internal 418 is selected, and the "Use for Join Now" option 506 can be selected. As shown in FIG. 12C, the tag, represented by checkmark 502, is now assigned to the Internal 418 phone number.

in further example embodiments, a tag is saved or flagged within the Connection fields 316 (shown in FIG. 9), for example using an XML tag or other indicator.

Referring again to FIG. 10, as indicated above, an identifier for the particular profile can be saved such that the host device 11a can send an invitation message for the conference call, excluding the moderator access code 410. For the following example, it is presumed that an identifier for excluding sending of the moderator access code 410 to invited participants is saved for this particular profile and session. Thus, the host device 11a sends an invitation message to an invited participant device in relation to the scheduled conference call, wherein the message includes the address information and the participant access code 412 but excludes the moderator access code 410. The identifier for this exclusion is checked and verified prior to sending.

Figure 13:
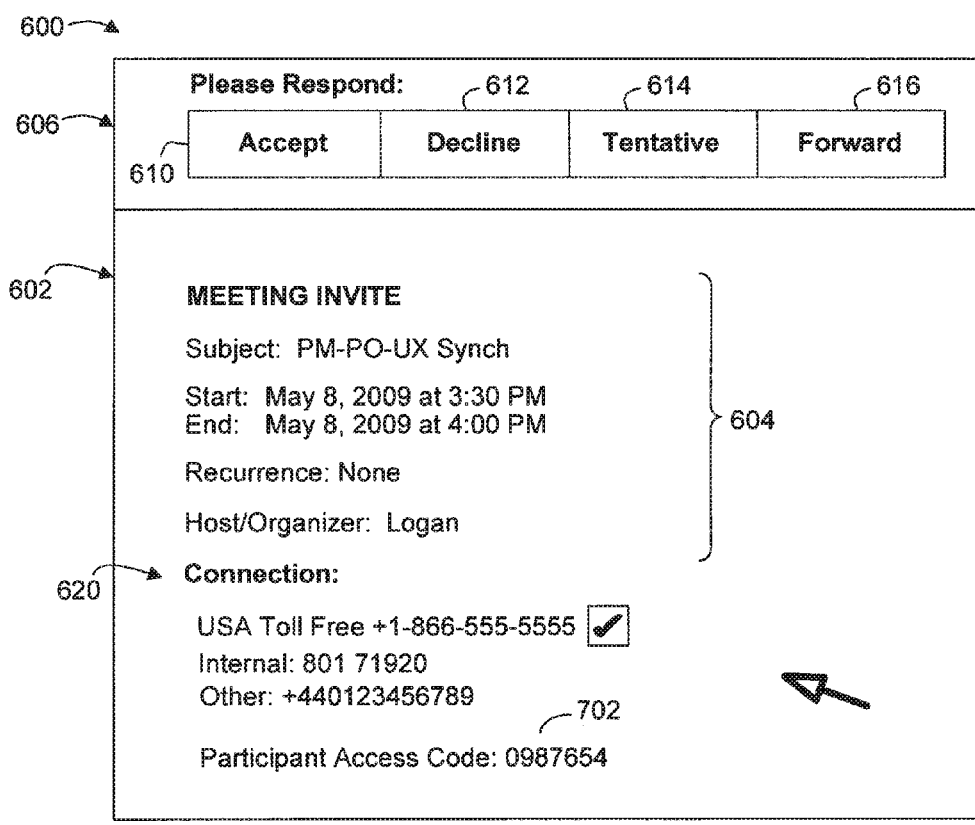
FIG. 13 shows an example user interface for displaying a received invitation message on a mobile communication device, in accordance with an example embodiment.

Accordingly, reference is now made to FIG. 13, which shows a user interface 600 for displaying a received invitation message 602 on a non-host participant device 11. The device 11 first receives the invitation message 602 from another communication device, such as host device 11a, with respect to a scheduled conference call. As shown, the message 602 as displayed can include a number of fields 604 which relate to conference call scheduling information. The fields 604 include Subject, Start time, End time, Recurrence, Host/Organizer, and Connection 620. The Connection 620 can include sub-fields containing a plurality of connection addresses for operatively connecting to the enterprise communications platform 14, such as web information or audio (dialing) information (not shown) and participant access code 702 for accessing the conference call. The moderator access code is not present as it was not received by the device 11. In some example embodiments, the example user interface 600 can be displayed using a calendar application or a conference calling add-on, plug-in or app, as a stand-alone or in combination with other applications. The user interface 600 can also form part of the conference call session scheduling process.

In some example embodiments, the invitation message 602 can be received as an e-mail message designating the participant's e-mail address, but can also be in other forms such as short message service (SMS), SIP message, instant messaging, or calendar invite. The message 602 can be received directly or indirectly from a host device 11a.

As shown on the interface 600, a number of response options 606 can be selected in order to respond to the invitation message 602. As shown, the response options 606 include Accept 610, Decline 612, Tentative 614, or Forward 616. Upon selection of one or more of the response options 606, a communication containing the response is sent to the host device 11a. In further example embodiments, selection of the Accept 610 option can result in the details of the invitation message 602 being stored as a calendar event record in a calendar application of the device 11. The Forward 616 option can be used to forward the invitation message to a new participant client device.

Reference is now made to FIG. 14, which shows an example interface 700 for editing the received invitation message. As shown in the interface 700, the moderator access code or field is absent as no moderator access code was received from the host device 11a. The participant access code 702 is displayed and stored, and can be used by the device to access the conference call when contacting the enterprise communications platform 14.

Through the interface 700, invited users can select from a list which phone number or address they would like to use for the join now button 1202 (shown in FIG. 15). At the time of the scheduled conference call, or a specified time beforehand, the devices 11 can display the reminder interface 1200 including the join now button 1202 (shown in FIG. 15), to dial or link into the enterprise communications platform 14.

In some example embodiments, the interface 700 can now be used by the non-host participant device 11 to save the particular profile, either automatically or manually. This profile can be saved for future use and retrieval of the fields, for example the particular address and participant access code information. For example, the user can schedule a future conference call with the same address and participant access code information.

Referring again to the interface 600 of FIG. 13, if web information is received, an address link (not shown) can be selected as the default join option for joining the conference call session. If the conference call is a closed call, the enterprise communications platform 14 can then authenticate the device 11, for example by authenticating an identifier of the device 11 (in one embodiment, using a particular persistent device identifier). Upon authentication, a conference call session can be established between the device 11 and the enterprise communications platform 14, which can include a media session 126 (shown in FIG. 6).

As can be appreciated, in some example embodiments the address link can identify the enterprise communications platform 14 as well as the scheduled conference call session and/or the participant identifier, and can include a Uniform Resource Locator (URL), a Uniform Resource Identifier (URI), or other suitable address.

Figure 8:
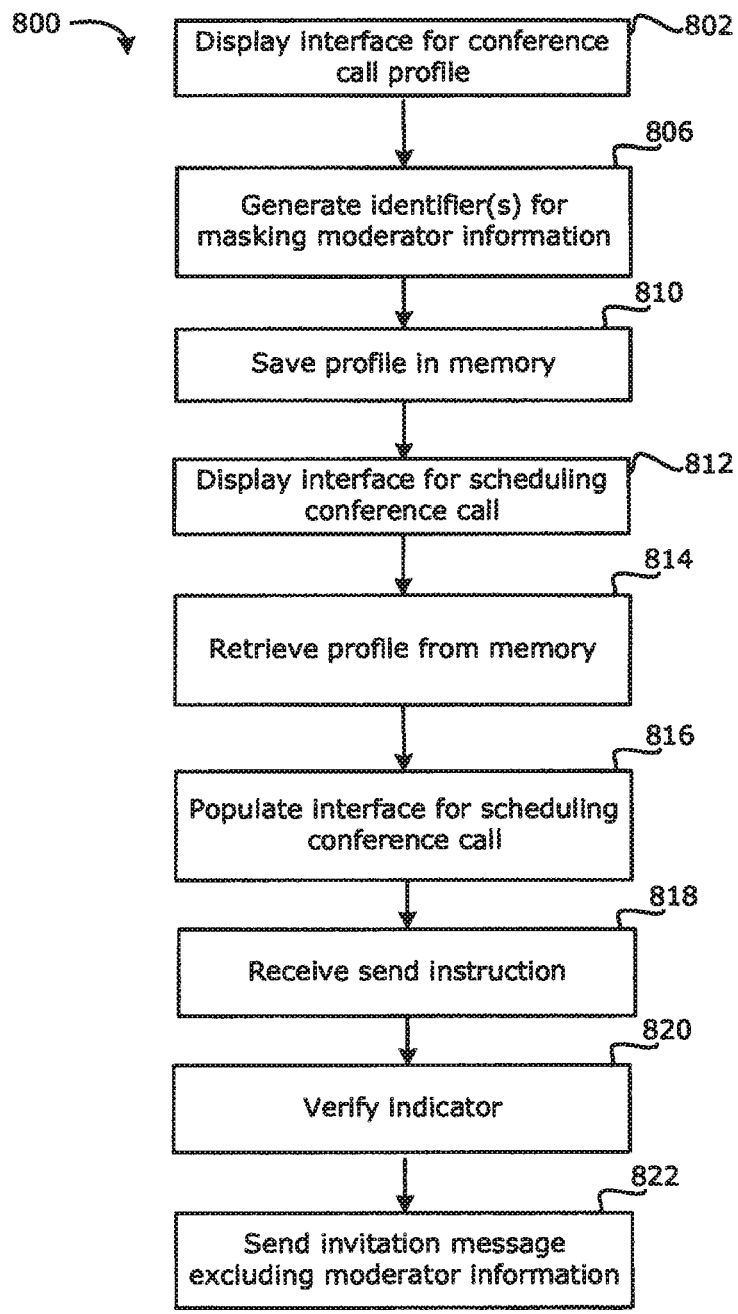
FIG. 8 shows an example flow diagram of a method for protecting moderator access in accordance with an example embodiment.

Reference is now made to FIG. 8, which shows an example flow diagram of a method 800 for protecting moderator access in accordance with an example embodiment. At step 802, an interface is displayed for the interface can be used for receiving user input for creating a new conference call profile, or editing an existing conference call profile. The user can edit conference call scheduling information, such as editing one or more addressees for communicating with a conference call server. The user can also edit a moderator access code and a participant access code. At step 806, the device can generate an indicator for the conference call profile for excluding sending of moderator information, such as the moderator access code, to invited participants. This can be based on user input, for example by selecting or deselecting a checkbox. At step 810, the conference call profile is stored in memory, along with the indicator.

The user can then wish to create or schedule a new conference call. Thus, at step 812, the device displays a conference call scheduling interface for scheduling a conference call. At step 814, the device retrieves the conference call profile from the memory. This can be based on the user selecting a desired conference call profile. At step 816, the device populates the conference call scheduling interface with at least some of the stored profile. The user can further edit the scheduled conference call through the conference call scheduling interface. At step 818, a send instruction is received, for example by user input through the conference call scheduling interface. At step 820, the device verifies whether the indicator states that the moderator access code is to be excluded. At step 822, the device accordingly sends an invitation message to the invited participants in relation to the scheduled conference call. The invitation message includes the participant access code and excludes the moderator access code.

In some example embodiments, at least some of the method 800 can be performed by a host device 11a or a non-host participant device 11, depending on the particular application. For example, referring again to step 802, the interface for editing the profile can be populated by the device at least partially based upon an existing conference call event record, such as one that was previously created, received, or sent by the device. This allows an existing record to be the basis or starting point for a new profile.

It can be appreciated that, in some example embodiments, the moderator access code need not be limited to a dialed passcode, but can be a computer-based password or key (encryption or signature) when accessing the address link.

It can be appreciated that some example embodiments can be used to exclude or mask other moderator information, such as the moderator's present or anticipated location.

It can be appreciated that the specific words as shown in the various user interfaces are intended to be illustrative only. For example, any suitable words or phrases can be used, and would not be limited to the English language. For example, any number of multi-lingual variations in different languages can be displayed or output from the device.

Variations of the above example systems and methods can be used. While some of the above examples have been described as occurring in a particular order, it will be appreciated to persons skilled in the art that some of the messages or steps or processes can be performed in a different order provided that the result of the changed order of any given step will not prevent or impair the occurrence of subsequent steps. Furthermore, some of the messages or steps described above can be removed or combined in other embodiments, and some of the messages or steps described above can be separated into a number of sub-messages or sub-steps in other embodiments. Even further, some or all of the steps of the conversations can be repeated, as necessary. Elements described as methods or steps similarly apply to systems or subcomponents, and vice-versa. Reference to such words as "sending" or "receiving" could be interchanged depending on the perspective of the particular device.

Variations can be made to some example embodiments, which can include combinations and sub-combinations of any of the above. The various embodiments presented above are merely examples and are in no way meant to limit the scope of this disclosure. Variations of the innovations described herein will be apparent to persons of ordinary skill in the art having the benefit of the present disclosure, such variations being within the intended scope of the present disclosure. In particular, features from one or more of the above-described embodiments can be selected to create alternative embodiments comprised of a sub-combination of features which might not have been explicitly described above. In addition, features from one or more of the above-described embodiments can be selected and combined to create alternative embodiments comprised of a combination of features which might not have been explicitly described above. Features suitable for such combinations and sub-combinations would be readily apparent to persons skilled in the art upon review of the present disclosure as a whole. The subject matter described herein intends to cover and embrace all suitable changes in technology.

What is claimed is:

1. A method for protecting moderator access using a communication device, the method comprising:
displaying an interface for editing a conference call profile, the conference call profile including conference call scheduling information including one or more addresses for communicating with a conference call server, wherein the conference call scheduling information further includes a moderator access code and a participant access code;
generating an indicator for the conference call profile for excluding sending of the moderator access code to invited participants;

storing the conference call profile including the indicator in a memory of the communication device; and sending a message to the invited participants in relation to a conference call scheduled using the stored conference call profile, the message including the participant access code and excluding the moderator access code if the indicator indicates excluding the moderator access code.

2. The method as claimed in claim 1, further comprising displaying a selectable option on the interface to exclude sending the moderator access code to invited participants.

3. The method as claimed in claim 2, wherein the generating of the indicator is in response to selection or deselection of the option.

4. The method as claimed in claim 2, wherein the selectable option includes a checkbox.

5. The method as claimed in claim 1, further comprising: displaying a conference call scheduling interface for scheduling a conference call.

6. The method as claimed in claim 5, wherein the conference call scheduling interface is configurable for identifying the invited participants.

7. The method as claimed in claim 5, further comprising: verifying the indicator prior to sending.

8. The method as claimed in claim 1, wherein the indicator includes a tag.

9. The method as claimed in claim 1, wherein the one or more addresses includes at least a phone number or an Internet address.

10. A communication device comprising:
a controller;
a communications subsystem;
a memory; and
a display for displaying an interface for editing a conference call profile, the conference call profile including conference call scheduling information including one or more addresses for communicating with a conference call server, wherein the conference call scheduling information further includes a moderator access code and a participant access code,
wherein the controller is configured for:
generating an indicator for the conference call profile for excluding sending of the moderator access code to invited participants,
storing the conference call profile including the indicator in the memory; and
sending a message to the invited participants in relation to a conference call scheduled using the stored conference call profile, the message including the participant access code and excluding the moderator access code if the indicator indicates excluding the moderator access code.

11. The communication device as claimed in claim 10, wherein the interface further includes a selectable option to exclude sending the moderator access code to invited participants.

12. The communication device as claimed in claim 11, wherein the generating of the indicator is in response to selection or deselection of the option.

13. The communication device as claimed in claim 11, wherein the selectable option includes a checkbox.

14. The communication device as claimed in claim 10, wherein the controller is further configured for: displaying a conference call scheduling interface for scheduling a conference call.

15. The communication device as claimed in claim 14, wherein the conference call scheduling interface is configurable for identifying the invited participants.

16. The communication device as claimed in claim 14, wherein the controller is further configured for: verifying the indicator prior to sending.

17. The communication device as claimed in claim 10, wherein the indicator includes a tag.

18. The communication device as claimed in claim 10, wherein the one or more addresses includes at least a phone number or an Internet address.

19. A non-transitory computer readable medium having stored instructions that, when executed by a communication device, cause the communication device to perform a method for protecting moderator access using the communication device, the method comprising:
displaying an interface for editing a conference call profile, the conference call profile including conference call scheduling information including one or more addresses for communicating with a conference call server, wherein the conference call scheduling information further includes a moderator access code and a participant access code;
generating an indicator for the conference call profile for excluding sending of the moderator access code to invited participants;
storing the conference call profile including the indicator in a memory of the communication device;
sending a message to the invited participants in relation to a conference call scheduled using the stored conference call profile, the message including the participant access code and excluding the moderator access code if the indicator indicates excluding the moderator access code.

20. The computer readable medium as claimed in claim 19, wherein the method further comprising displaying a selectable option on the interface to exclude sending the moderator access code to invited participants.

21. The computer readable medium as claimed in claim 20, wherein the generating of the indicator is in response to selection or deselection of the option.

22. The computer readable medium as claimed in claim 20, wherein the selectable option includes a checkbox.

23. The computer readable medium as claimed in claim 19, wherein the method further comprising: displaying a conference call scheduling interface for scheduling a conference call.

24. The computer readable medium as claimed in claim 23, wherein the conference call scheduling interface is configurable for identifying the invited participants.

25. The computer readable medium as claimed in claim 23, wherein the method further comprising: verifying the indicator prior to sending.

26. The computer readable medium as claimed in claim 19, wherein the indicator includes a tag.

27. The computer readable medium as claimed in claim 19, wherein the one or more addresses includes at least a phone number or an Internet address.

* * * * *